(12) United States Patent
Woerner et al.

(10) Patent No.: US 6,659,189 B2
(45) Date of Patent: Dec. 9, 2003

(54) SOD HARVESTING MACHINE

(75) Inventors: Edward E. Woerner, Elberta, AL (US); Darale G. Haney, Gulf Shores, AL (US)

(73) Assignee: Woerner Manufacturing, Inc., Elberta, AL (US)

( * ) Notice: Subject to any disclaimer, the term of this patent is extended or adjusted under 35 U.S.C. 154(b) by 0 days.

(21) Appl. No.: 10/081,572

(22) Filed: Feb. 21, 2002

(65) Prior Publication Data
US 2002/0179309 A1 Dec. 5, 2002

Related U.S. Application Data
(60) Provisional application No. 60/271,288, filed on Feb. 23, 2001.

(51) Int. Cl.[7] ............................................... A01B 45/04
(52) U.S. Cl. ............................. 172/20; 172/33; 414/911; 198/308.1
(58) Field of Search .............................. 172/20, 33, 19; 414/911; 198/308.1; 111/901

(56) References Cited

U.S. PATENT DOCUMENTS

| Patent No. | Date | Inventor | Ref |
|---|---|---|---|
| 2,617,347 A | 11/1952 | Provost | |
| 3,235,011 A | 2/1966 | Pasinski et al. | |
| 3,540,535 A | 11/1970 | Brouwer et al. | |
| 3,653,448 A * | 4/1972 | Morrill | 172/19 |
| 3,672,452 A * | 6/1972 | Miner | 172/19 |
| 3,776,314 A * | 12/1973 | Nunes, Jr. | 172/1 |
| 3,812,918 A | 5/1974 | Beck | |
| 4,828,040 A * | 5/1989 | Schumacher | 172/19 |
| 4,832,130 A | 5/1989 | Brouwer et al. | |
| 4,892,153 A * | 1/1990 | Cooling et al. | 172/20 |
| 4,944,352 A | 7/1990 | Brouwer et al. | |
| 5,064,000 A | 11/1991 | Dover et al. | |
| 5,165,617 A * | 11/1992 | van Vuuren | 242/535.1 |
| RE34,827 E | 1/1995 | Dover et al. | |
| 5,626,195 A | 5/1997 | Dover | |
| 5,775,436 A | 7/1998 | Noyes, II et al. | |
| 5,857,527 A * | 1/1999 | van Vuuren | 172/19 |
| 5,950,407 A | 9/1999 | Rosen | |
| 6,056,064 A | 5/2000 | deVries | |
| 6,273,196 B1 * | 8/2001 | Van Vuuren | 172/20 |
| 6,364,027 B1 * | 4/2002 | Tvetene et al. | 172/1 |

FOREIGN PATENT DOCUMENTS

EP  1021941  * 7/2000

* cited by examiner

Primary Examiner—Victor Batson

(57) ABSTRACT

A sod harvesting machine comprising a wheeled frame with single or dual cutterheads at the forward end and a sod-receiving wind-up saddle at the rear end. An endless conveyor with a single flight spans the length of the machine and cut sod which is received at the forward end is advanced rearwardly for elevation and transport to the wind-up saddle and discharge at the rear end. The wind-up saddle comprises an expandable frame with pivotally attached supporting arms which commence the wind-up operation in a generally closed "U" configuration, but are controllably adjustably expandable outwardly to open the saddle for continuously accommodating the increase in diameter of the sod roll being helically wound therewithin. When the sod roll reaches its maximum and completed size, the saddle arms are pivoted rearwardly to the horizontal for direct discharge from the harvesting machine onto the ground surface.

6 Claims, 5 Drawing Sheets

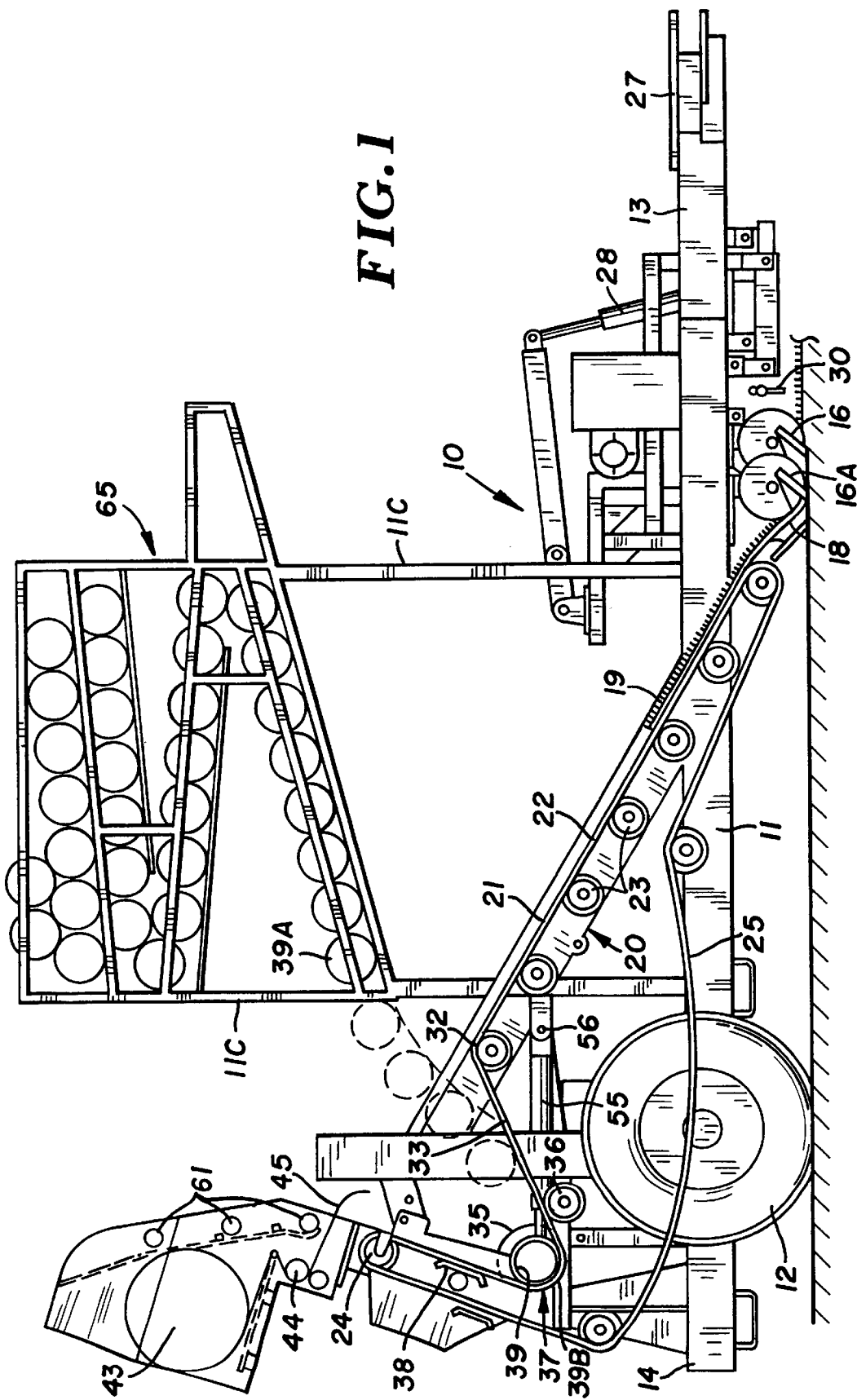

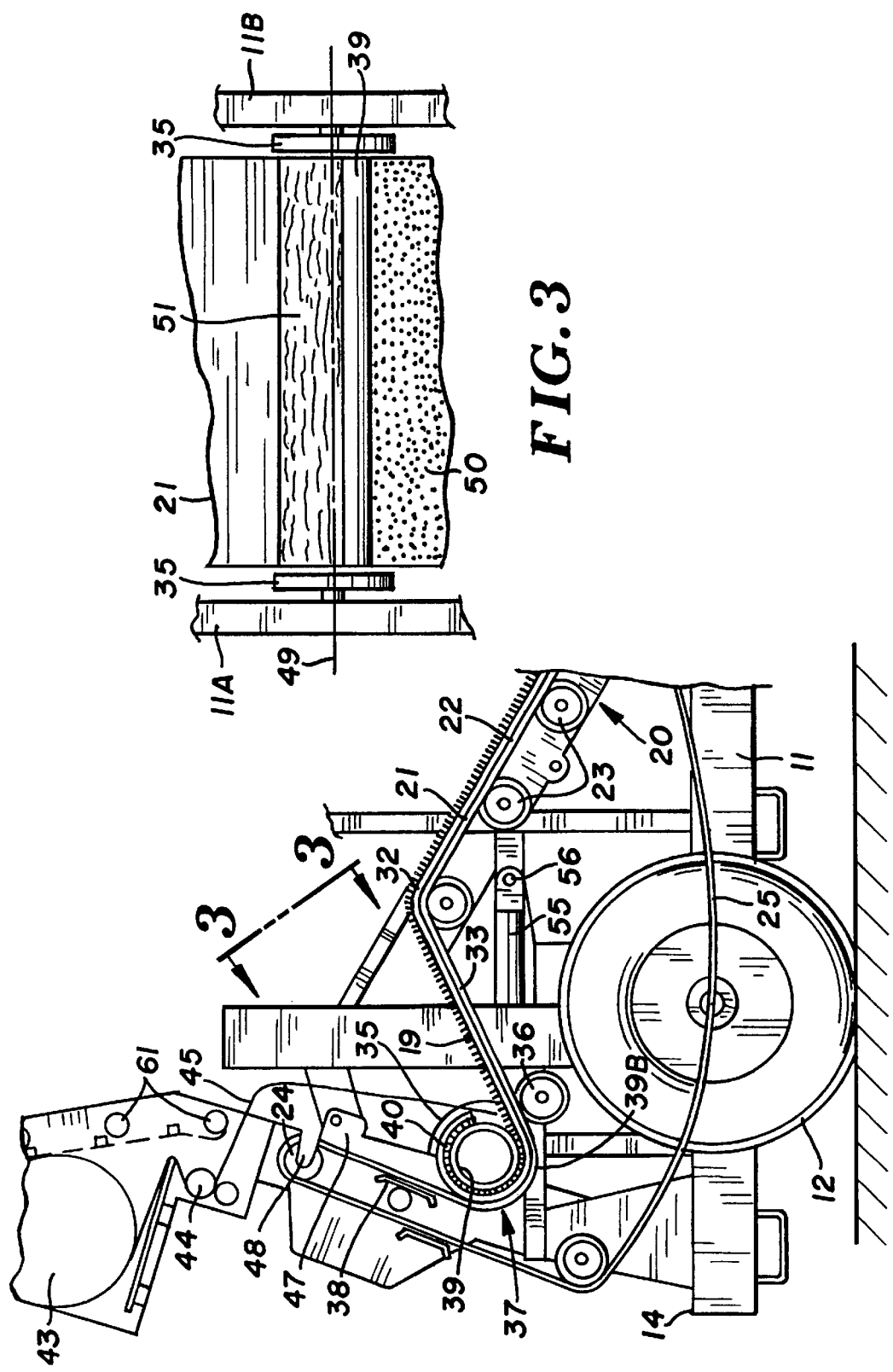

SOD HARVESTING MACHINE

CROSS-REFERENCE TO RELATED APPLICATION

The present application relates to that certain Provisional Application Serial No. 60/271,288, filed Feb. 23, 2001, entitled "SOD HARVESTING MACHINE".

BACKGROUND OF THE INVENTION

The present invention relates generally to a sod or turf harvesting machine, and more particularly to a harvester which is equipped with an endless conveyor having belt flight configuring means for continuously initiating, rolling, and discharging rolled turf or sod from the harvester structure. In this connection, the apparatus of the present invention includes a harvester device having a wheeled frame with opposed front and rear ends, and with a cutterhead mounted at the forward end, and a sod receiving wind-up saddle at the rear end. The endless conveyor passes between the ends along the length of the device, with the front end portion of the conveyor functioning to pick up cut sod from the cutterhead and the remainder functioning to transport and roll the cut sod, with the rear of the endless conveyor having drive means which functions with the components performing the winding operation. The top flight of the conveyor passing adjacent to said front end for receiving cut sod directly from the cutterhead, with the top flight extending and traveling rearwardly of the cutterhead for elevating, transporting and ultimately winding cut sod within the wind-up saddle. The path of the top flight of the conveyor belt along the rear of the machine is configured so as to actually form adjustable or expandable saddle walls as the sod rolls are being formed directly on and expanding within the configured belt. Flight supporting cylinders and platens against which the belt travels are mounted on an adjustably pivotably movable rear belt support arm, the support arm being controllably and adjustably positioned to define the configuration of the wind-up saddle and its roll confining walls, the walls being movable to adjustably control the operating width or jaw of the wind-up saddle. Additionally, the rear belt supporting arms comprise a mounting frame which is controllably positionable so as to permit the rear support to open to a flat disposition and thus enable the discharge of individual finished rolls of sod from the apparatus. With the conveyor configured in the roll discharge position, the rolls are discharged directly onto the surface.

Sod harvesting machines of the invention are provided for cutting and rolling sod for later transport from the sod farm to an appropriate destination where the rolls are to be ultimately deposited to form live turf. The harvesting machine is designed to cut and roll the sod in one continuous operation, and is also provided with means to cover the cut sod with a protective film of plastic or netting in order to protect the roll from the ambient and enhance its stability.

In the past, sod harvesting machines with multiple conveyors and wind-up mechanisms have been utilized, with these devices normally being highly complex and cumbersome, and with certain operations requiring intensive hand labor. The present arrangement reduces the necessity for a variety of systems and subsystems normally required, and provides a wind-up mechanism featuring a saddle which facilitates in-line rolling, wrapping, and discharging of rolls onto the adjacent surface for later pick up. The arrangement is designed for use with minimum of manual intervention. The harvesting machine is typically attached to a towing vehicle such as a tractor by means of a three-point hitch and may be operated by either a single operator or a pair of operators.

The wind-up portion of the winding mechanism comprises the rear section of the conveyor belt, with this section being configured in a "U" or "V" to form the initial sod receiving saddle portion of the mechanism. The saddle includes a pair of laterally spaced apart normally upwardly directed or extending rear saddle arms. The arms are positioned to provide a conveyor belt path to create the wind-up saddle and bed. In the wind-up mode, the entire wind-up bed is of an initial generally closed "U"-shape configuration with the base of the saddle being disposed at or adjacent the low-point of the conveyor flight. The base or bed of the saddle has an axis arranged generally transverse to the frame axis. The portion of the conveyor belt driving segment in the saddle zone includes at least one drive member such as a driven cylinder sprocket functioning as the conveyor drive and with a plurality of belt supporting idlers and guide platens also being provided in the saddle zone. Each cylinder and platen is mounted within the wind-up saddle transversely of the saddle arms for guiding and supporting the endless belt and otherwise controllably delineating the travel path of the top flight of the conveyor. The conveyor carries lengths of incoming cut sod into the saddle zone where it is helically wound into rolls and discharged from the rear end onto the ground.

The upwardly extending rear saddle arms are pivotally coupled at their lower ends to the frame. Actuating means are coupled to the arms for coordinated selective and adjustable pivotal rotation of the arms relative to the frame. The controlled pivotal rotation provides motion between closed and opened saddle dispositions, this motion controllably enlarging the size of the wind-up bed while cut sod is continuously being received and wound and thereby growing helically. Sod cut-off means are disposed directly ahead of the cutterhead and provided with actuating means for periodically severing the sod so that incoming cut sod is formed in rolls of defined lengths. When a given defined length of incoming cut sod has passed along the conveyor and completed its wind-up operation within the device, the actuating means for the rear saddle arms are further extended rearwardly and dropped flat to provide the conveyor with an open tailgate configuration for controlled discharge and dropping of the finished roll onto the surrounding ground.

A layer of netting or film may be applied to the sod as it is being helically wound into a roll, with the netting or film being provided from a supply roll positionably mounted within the saddle assembly. Means are provided for unwinding and guiding the film from the supply roll into contact with the sod being formed into helically wound rolls and for periodically severing the unwound film into appropriate lengths whenever the roll-up operation for a given roll is complete. For most purposes, the netting or film is applied to the outer layers of the helically wound material, it being unnecessary to cover the entire surfaces of the roll with such netting or film.

One of the valuable features of the present invention is the utilization of the top flight of the conveyor to function as a transport mechanism, a wind-up saddle defining mechanism, as well as an unloading or roll discharge mechanism. In its roll-up or winding configuration, the conveyor belt makes contact with the sod along a sufficiently large surface area so as to create the friction necessary for the initial start of the wind-up operation about a central cylindrical core which has already been dropped into the saddle zone. Furthermore, as the mass and size of the roll about the core increases, the area of contact between the sod and the belt surface may decrease, but given the force created by the increased weight and friction, the wind-up operation continues to move smoothly. In other words, the top flight of the single conveyor first elevates the sod to a high point or apex, then proceeds in a downward declining path to the saddle where the belt reaches a second point of inflection and commences an upward direction of travel. This second point of inflection is where the sod roll-up operation is initiated. When the winding operation is completed, the roll is dropped from the machine and discharged onto the ground surface. These functions are all performed sequentially and smoothly by the single conveyor mat or flight as the harvester machine continues to move forwardly bringing in more cut sod for the roll-up operation.

The adjustably movable support arms which serve to delineate, define and guide the conveyor belt in the wind-up saddle zone are capable of pivotal movement to controllably expand the operating width of the wind-up saddle zone. Thus, as the helical wind-up operation progresses, the diameter of the resultant roll increases until the roll reaches its maximum size as determined by the predetermined cut length. Once this stage of the operation has been reached, the pivotal rotational motion of the upwardly extending saddle arms drops the conveyor belt supporting arms to substantially horizontal but descending position with the conveyor belt continuing to advance and function. When the saddle is moved to the open disposition, the downward slope of the belt together with continued belt motion carries the roll to a roll-out position whereupon it is permitted to roll freely off the arms such as in the fashion of an open downwardly inclined tailgate.

There is an optional core-dispenser attached to the system which loads roll cores onto the conveyor whereupon the sod will preferably be initially wrapped around the core during the actual wind-up operation.

SUMMARY OF THE INVENTION

Therefore, it is a primary object of the present invention to provide an improved sod harvester which incorporates in a single mechanism a sod cutter or cutters, a wind-up mechanism and an unloading means, all operable with minimal manual intervention and as the machine moves forwardly.

It is a further object of the present invention to provide an improved sod harvesting mechanism which incorporates a continuously variable width saddle zone for receiving, initiating, rolling, and ultimately discharging rolled freshly cut turf therefrom, the width of the saddle zone being delineated by a conveyor flight which is pivotally moveable to guide and roll the freshly cute turf.

It is a further object of the present invention to provide an improved sod harvesting apparatus which incorporates a net or film applicator which supplies netting onto the cut sod during the roll-up operation as deemed helpful for the operation.

It is yet a further object of the present invention to provide a continuously adjustably pivotable conveyor for initiating, rolling, and discharging rolled turf, wherein means are provided for chopping or cutting sod into predetermined lengths prior to rolling for delivering finished rolls of turf or sod with a predetermined overall turf area.

Other and further objects of the present invention will become apparent to those skilled in the art upon a study of the following specification, appended claims, and accompanying drawings.

IN THE DRAWINGS

FIG. 1 is a side elevational view of a preferred embodiment of the present invention, and illustrating a loading mechanism to elevate cut turf being received at the leading portion of the conveyor, and illustrating in phantom the path of an individual winding core as it drops from the core storage rack into the saddle zone of the saddle and roll-up zone of the conveyor;

FIG. 2 is a detail side elevational view, partially broken away, and illustrating the detail of the wind-up saddle in the configuration as the sod roll-up operation is initiated, and wherein the netting is being delivered onto the outer surface of the sod being rolled;

FIG. 3 is a sectional view, partially broken away, taken along the line and in the direction of the arrows 3—3 of FIG. 2;

Figure 4:
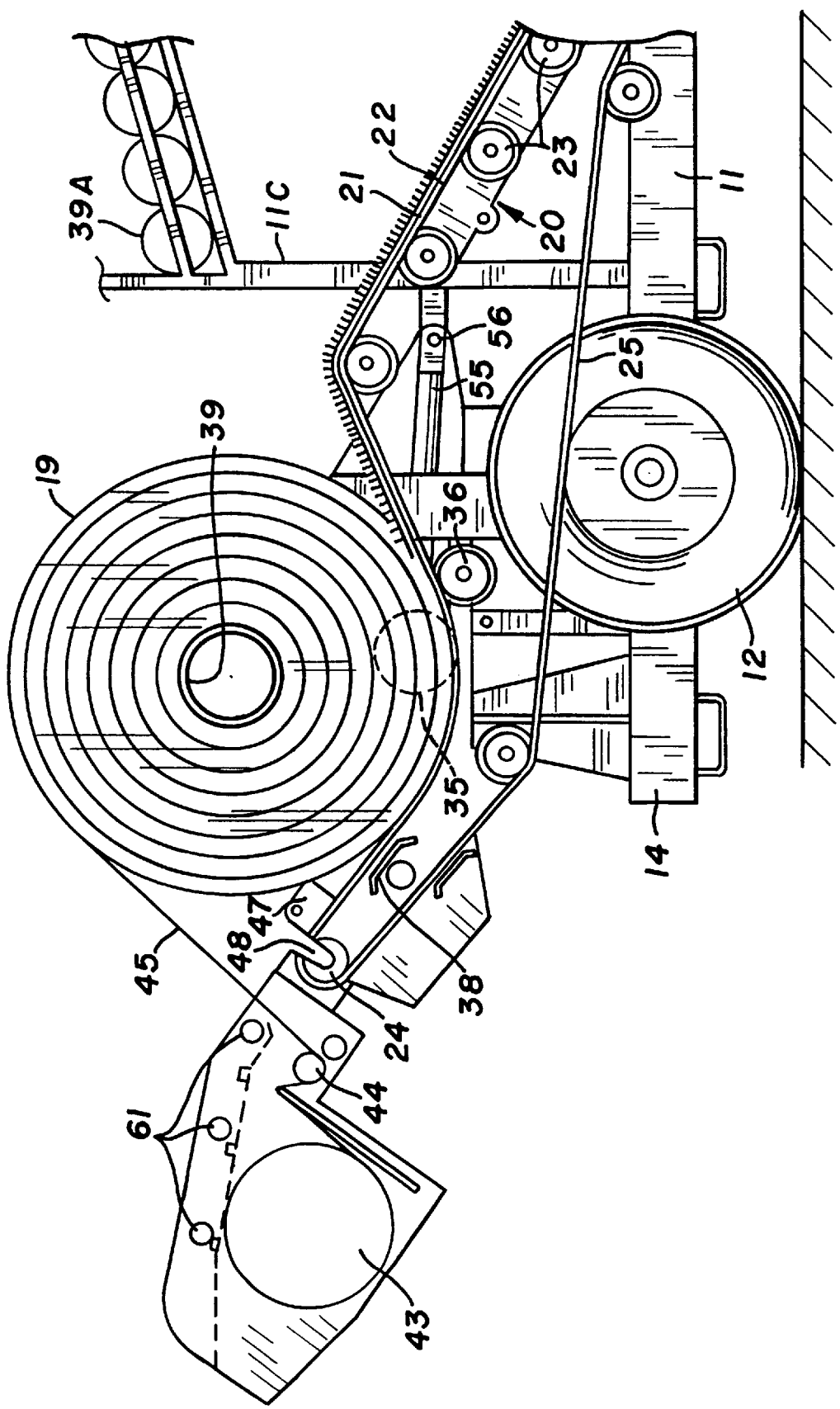
FIG. 4 is a view similar to FIG. 2 and illustrating the configuration of the wind-up portion of the conveyor after the winding operation has progressed, and illustrating the apparatus after a moderate increase in roll girth due to the continuous winding, and also illustrating in phantom the conveyor belt guide or idler roller.
Figure 5:
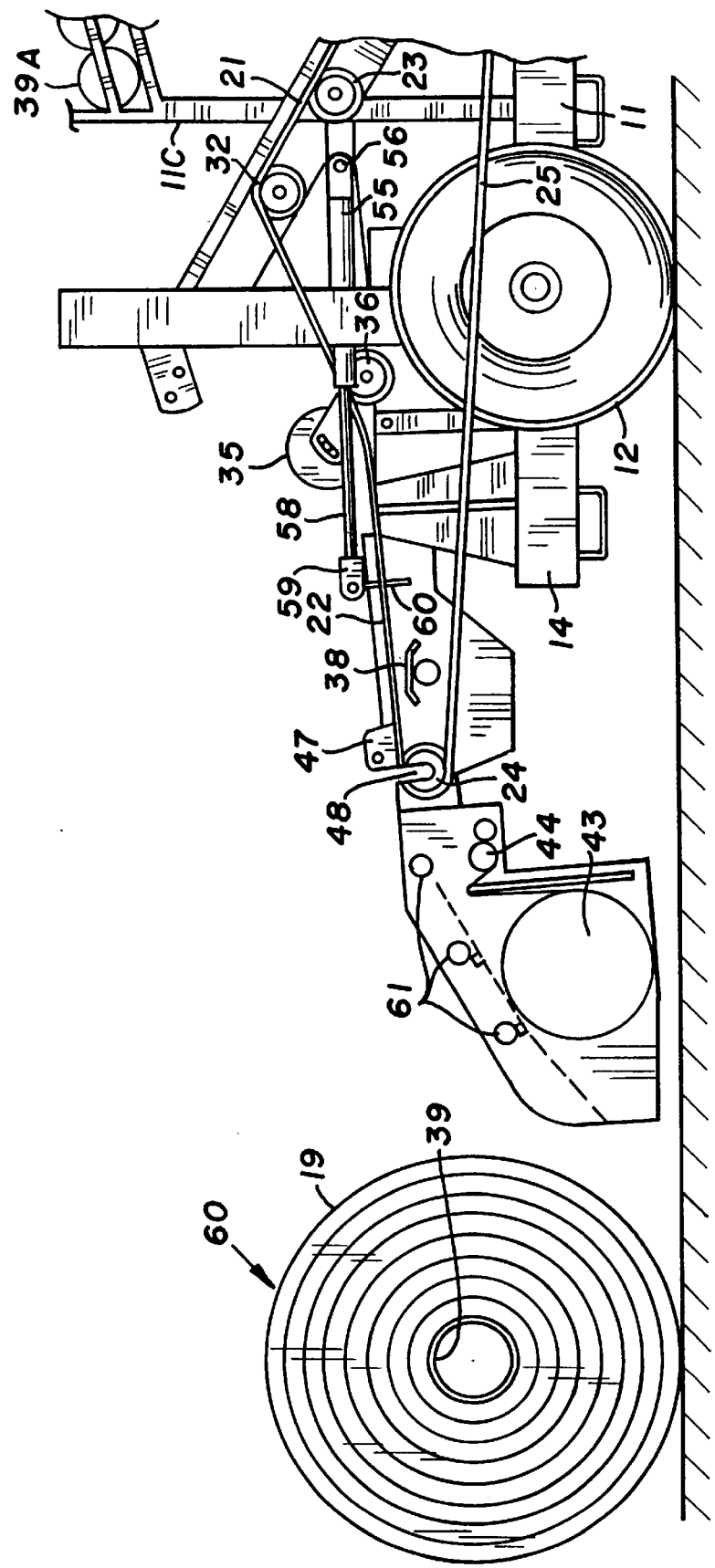
Figure 6:
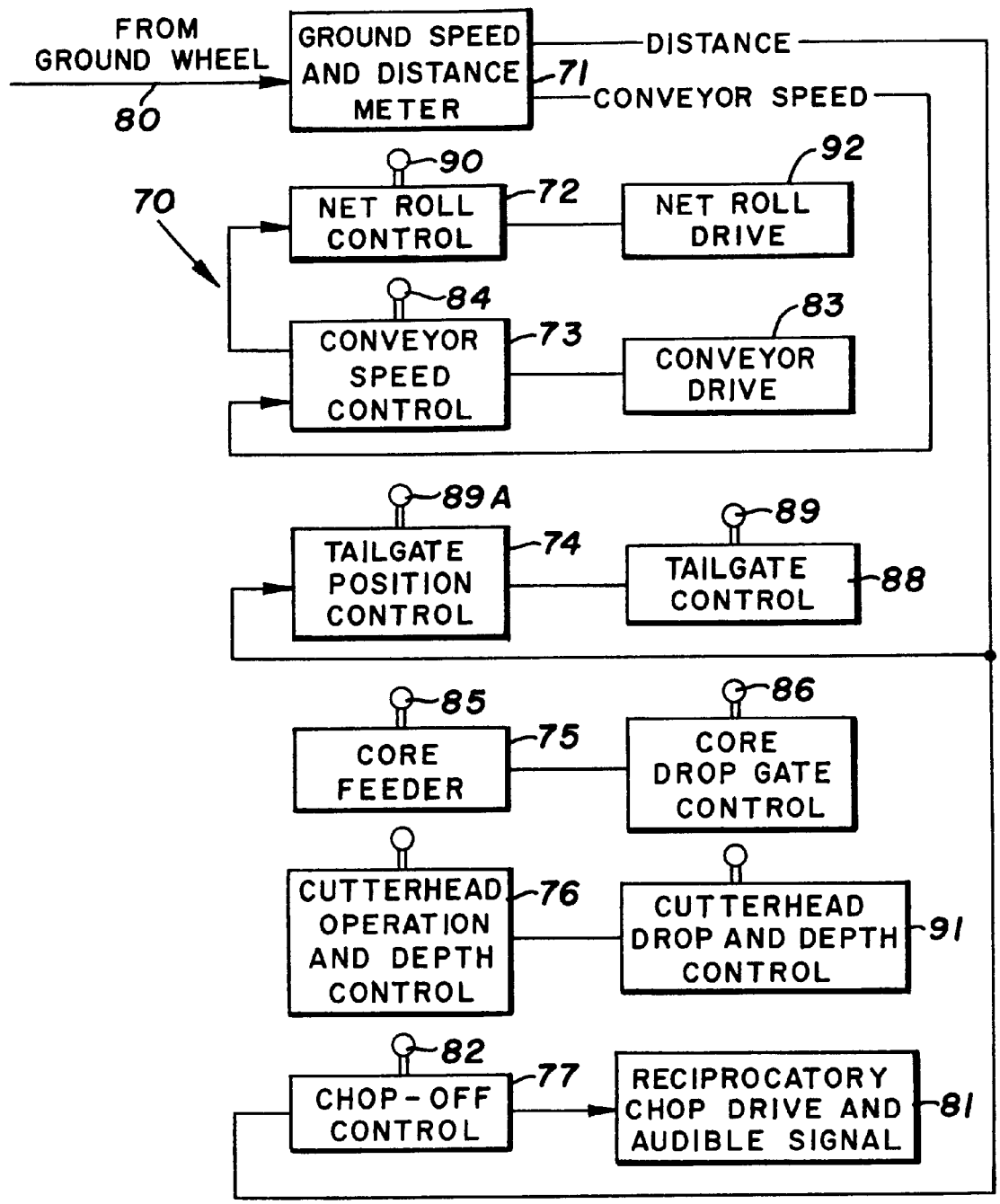

FIG. 5 is a view of that portion of the harvester apparatus illustrated in FIG. 4, and illustrating the configuration of the wind-up mechanism as it is dropped to a finished roll discharge disposition; and FIG. 6 is a schematic block diagram illustrating the interaction of various components included in the harvester system illustrated in FIGS. 1–5, and further illustrating the control circuit for actuating operative components in the course of the wind-up and discharge operations.

DESCRIPTION OF THE PREFERRED EMBODIMENT

With attention now being directed to FIG. 1 of the drawings, the sod harvesting machine generally designated 10 comprises a wheeled frame 11 supported by a pair of laterally disposed pneumatic wheels as at 12, with the frame having opposed ends including the front end as at 13 and the rear as at 14. As further shown in FIG. 1, a cutterhead or alternatively one of a pair comprising dual cutterheads 16 is mounted on the front portion of frame 11, cutterhead 16 including conventional edge cutters and an earth penetrating horizontally disposed blade, all of which is known and conventional in the art. A sod or turf receiving upwardly extending guide ramp 18 may direct the cut sod or turf upwardly, with ramp 18 providing an elevating support for the cut sod or turf 19 for entering onto the endless conveyor mechanism such as shown generally at 20. Endless conveyor 20 is provided with an endless conveyor belt 21 having a top flight 22 arranged and extending rearwardly along the length of the harvester and supported by idler cylinders or wheels as at 23—23, along with a drive cylinder or sprockets as at 24. Drive cylinder 24 is typically powered by a hydraulic motor, with such drive systems being known in the art. Belt 21 which comprises steel rods and rubber straps is rendered endless with the lower or return of bottom flight shown at 25. Frame 11 is provided with a hitch mechanism as at 27, with hitch 27 normally being a conventional three point hitch.

The cutterhead 16 is provided with a depth control mechanism as at 28, with depth control 28 being utilized to control the elevation of lateral disc cutters 16A as well as the depth of the horizontally disposed sod cutter blade (not shown). Such depth control mechanisms are known in the art.

Cutterhead mechanism 16 further includes a chop blade as at 30, with blade 30 being driven intermittently along a reciprocatory up-and-down path, with chop blade 30 penetrating the soil and turf to a distance sufficient to enable the individual rolls to be effectively cut-to-length.

The Conveyor Operation

As indicated, conveyor 20 is equipped with an endless belt 21 having a top flight 22 passing adjacent the front end 13 of the apparatus, and designed to receive cut sod directly from the cutterhead, specifically from ramp 18. Top flight 22 extends along the length of frame 11 with the forward portion of the top flight traveling along a path both elevating and transporting the cut sod toward the rearwardly disposed wind-up saddle. Belt 21 reaches an apex point as at 32 whereupon the direction of travel is converted to downwardly extending direction, such as is illustrated at 33. The purpose of the downwardly extending portion of flight 22 is for moving the cut sod or turf into the wind-up saddle zone so that winding will automatically commence. Belt 21 being comprised of steel rods and rubber straps provides sufficient contact friction with the sod for the wining operation to proceed.

The path of top flight 22, as belt 21 continues along declining path 33 is controlled by guide roller 35. In this connection, guide roller 35 defines the path of top flight 22 as it enters or defines the wind-up saddle, with idler 36 being utilized to further define the saddle. As indicated in FIG. 1, the wind-up saddle zone shown generally at 37 is further shown with a core 39 disposed therewithin. From the base point 39B of saddle 37, belt 21 is guided upwardly around the periphery of guide roller 35, and being further guided by belt guide or platen 38, and thereafter continuing to the point where belt 21 wraps about drive roller 24.

With attention now being directed to FIG. 2 of the drawings, cut sod or turf 19 is shown as it enters wind-up saddle 37, and initiates its wrap about the core 39. The friction between the surfaces of the cut turf or sod 19 and top flight 22 of belt 21 is sufficient to propel or advance the leading edge portion 40 of sod 19 about the circumference of core 39, with the arrangement providing for the sod to push under the floating core for substantially 180° of wrap against the upper surface of sod 19. Thus, the initiation of the winding about core 39 is routinely and automatically obtained.

It is further indicated in FIG. 2, a supply roll 43 of netting, screening, or plastic resinous film (normally polyethylene) is provided, with supply roll 43 being illustrated as mounted upon the extreme upper end of saddle. Net roll 44 delivers a quantity of film or netting (film) through the bite zone of net rolls 44, with a plastic netting or film continuing along a path as shown at 45 until it makes contact with the outer surface of the partially completed roll. At the point of contact, the netting is being advanced at the same rate of speed as the sod, therefore permitting the netting to become a part of the wrapping operation, and indeed in contact with the earthen or soil surface of the sod.

While it is normally practical to utilize netting in the wind-up operation, it is not necessary for netting to be employed throughout the entire operation, but it is preferably present as the wind-up operation approaches completion. In FIG. 2, the netting is illustrated as being initiated early on, however the netting would normally be applied only toward the end of the wind-up operation and while several revolutions of the wind-up operation remain to be completed. In order to cut the netting into a length for each sod roll, the cutting operation is achieved by permitting a sufficient number of wraps of netting to be wound about the sod, and with the locking net rolls 44 in place, the netting will simply become broken away at a point adjacent the net roll. The next net application operation can be started by initiating action of net rolls 44 and permitting the netting to follow along a drop path as at 45 into contact with the roll.

The Saddle Operation

With attention also being directed to FIG. 3 of the drawings, it will be noted that guide rollers 35—35 provide the configuration for wind-up saddle 37, and thus provide a resting zone for core 39. The wind-up axis for core 39 is shown at 49. As further indicated in FIG. 3, the grass-surface of turf or sod 19 is illustrated at 50, with the soil-back surface being shown at 51. Support for guide rollers 35—35 is provided by laterally disposed frame members 11A and 11B.

With attention also being directed to FIG. 3 of the drawings, it will be noted that guide rollers 35—35 provide the configuration for wind-up saddle 37, and thus provide a resting zone for core 38. The wind-up axis for core 38 is shown at 49. As further indicated in FIG. 3, the grass-surface of turf or sod 19 is illustrated at 50, with the soil-back surface being shown at 51. Support for guide rollers 35—35 is provided by laterally disposed frame members 11A and 11B.

As indicated hereinabove, and with added attention being directed to FIGS. 4 and 5 of the drawings, lift cylinder 55 is shown with clevis 56 anchoring or supporting cylinder 55 along upright frame post 11C. A pair of cylinders 55 may be employed if desired, with each such cylinder being mounted on opposite sides of the harvester. Operation of dual cylinders will, of course, be undertaken by conventional hydraulic circuitry. The hydraulic ram shown in FIG. 5 extending from cylinder 55 is coupled through clevis 59 to rear support arm 47. Linkage as at 60 provides the coupling. The positioning of ram 58 will, accordingly, adjust the angular position of rear support arm 47 to define the path of upper flight 22 of belt 21. In the disposition shown at FIG. 5, upper flight 22 is arranged along a descending path as it enters the saddle, thereby permitting conveyor belt 22 and its supports to function as a tailgate to drop a completed roll as illustrated generally at 60 (FIG. 5). In other words, sod or turf 19 has been helically wound about core 39 to form a completed roll 60. To assist in the discharge or dumping operation, idler rolls as shown at 61—61 are provided for this purpose. The phantom lines of FIG. 5 illustrate a bed-path for supporting completed roll 60 as it is discharged from the apparatus.

As the winding operation is advanced from the disposition illustrated in FIG. 2, the width of the "U"-shaped saddle is increased, with FIG. 4 illustrating the disposition as the roll nears completion, and as the "U" saddle has been widened to accommodate the ongoing growth of the roll. The progression of turf 19 as it is being rolled requires that the link to the saddle be progressively expanded so as to accommodate the rolls which are being formed directly on the top of the conveyor belt 21. Thus, as the roll increases in size, supporting cylinders and platens as illustrated at 36 and 38 assist in maintaining the integrity of the wind-up saddle and the expanding roll as it progressively increases its diameter. As the size of the roll gradually increases, it can be seen that the area of contact between the belt and the roll is constantly changing, however the weight of the roll has been found sufficient to continue and maintain the wind-up operation. As indicated hereinbelow, the operation of cylinder 55 and its ram is controlled so as to substantially constantly advance the width of the "U" configuration of the wind-up saddle so as to accommodate the increasing diameter of the turf roll. The width of the "U" configuration is advanced either continuously or alternatively it may be advanced in steps. When a stepping function is utilized, it is possible to undertake the motion in approximately three separate steps or more. Also, as indicated hereinabove, the portion of conveyor belt 21 which passes along the rear surface of the "U" is ultimately permitted to open to a flat and downwardly incline disposition so as to create an on-demand discharge gate for finished rolls of sod.

With attention now being again directed to FIG. 1 of the drawings, it will be observed that a supply of individual cores is stored on the machine within core storage rack 65. Core storage rack is supported on frame 11 primarily by upright posts as shown at 11C, thus creating a cradle network for the supply of cores. Means such as an intermittently operated gate are provided for the dropping of an individual core from the supply as shown at 39A wherein the individual core, under the influence of gravity, follows the drop path indicated in phantom in FIG. 1. The gate may either be automatic or operated by hand.

With attention now being directed to FIG. 6 of the drawings, the description of the control mechanism will be described hereinafter. The control mechanism 70, shown schematically in FIG. 6, comprises a ground speed and distance speed 71, along with a series of individual control systems. Control systems include net roll control 72, conveyor speed control 73, rear support arm tailgate positioning control 74, core feeder control 75, cutterhead operation and depth control 76, and chop blade control 77. Each of the controls functions in combination with the mechanism illustrated in FIGS. 1–5, the operation of which is as follows:

Ground wheel 12 is equipped with a conventional rotary counter, preferably magnetic, (not shown) which delivers a signal to input 80 provides an indication or measure of ground speed and also inputs to distance meter 71. Thus, the data obtained from ground wheel include both ground speed of the harvester as well as distance. The distance indicator is utilized to control the action of reciprocatory chop drive as at 81, for intermittently actuating chop 30 thereby defining the length of sod or turf present in each individual sod roll, such as roll 60. In addition to the chop drive, an audible signal is preferably obtained in advance of each chop operation. In the event hand control of the chop is desirable, hand control 82 is provided.

Conveyor speed control, as indicated at 73, is utilized to activate and control conveyor drive through drive control 83. Thus, when desired, conveyor speed can be precisely coordinated with ground speed, although such control is not always essential. If hand control of conveyor speed and motion is desired, handle 84 is provided. For many applications, conveyor speed may be pre-set to a normal cutting speed, with control 83 being configured in such a way that it operates primarily under hand control.

As the wind-up operation is commenced, a core feeder is actuated through control 75, with the core feeder normally being a manual operation through a hand control lever positioned in proximity to an operator, with such a control being accomplished through a simple manual hand-actuated linkage as at manual lever 86.

With attention now being directed to FIGS. 4 and 5, the disposition of support arm 47 will define the configuration of the wind-up saddle through lift cylinder 55. Tailgate position control is further utilized to position rear support arm 47 for the discharge disposition as illustrated in FIG. 5. Hand operation of the tailgate position control is undertaken by control lever 89.

Net roll control 72 along with net roll drive 92 is utilized to initiate rotational motion of net rolls 44, as well as the locking of rolls 44 to permit automatic tear-off of netting from net roll supply 43. This operation may also be undertaken automatically through conveyor speed control, or alternatively through distance control. In either event, hand control is also possible through hand lever 90.

As indicated hereinabove, cutterhead operation and depth control is also a desirable feature, with the cutterhead operation and depth control being shown at 76 and 91. Normally cutterhead operation and depth control is a function undertaken by the operator, with the cutterhead being lowered its operative disposition, and permitted to remain at that level during the working cycle. For transport positioning, the cutterhead is elevated to a travel position where it is safely out of contact with the road or other supporting surface.

Operation—Wind-up Mode

The forward segment of conveyor belt 21 travels along a gradually ascending upwardly directed path from the sod receiving end or the wind-up end, until reaching a high point where there is a first inflection point such as at apex 32. At apex 32, the rearward segment of the conveyor travels along a gradually descending path until a second point of inflection is reached, the second inflection point being the wind-up saddle zone where the belt path resumes upwardly directed travel. Upwardly directed travel continues with the slope of the path changing in response to the opening of the wind-up zone to accommodate increase in sod roll diameter.

Operation—Roll-off Mechanism

Upon reaching full size due to completion of winding an entire pre-cut length of sod, the path for the rearward segment of upper flight 22 of conveyor belt 21 is again modified when the conveyor belt support arms including the rearward support arms 47 and accompanying belt assembly is dropped to assume a roll-off or discharge position. Ongoing belt motion or travel together with the downward slope of the belt is sufficient to cause the roll 60 to be discharged directly onto the ground. Thereafter, the arms 47 are again pivoted through the action of cylinder 55 to a substantially upright position whereupon the wind-up operation for the next succeeding cycle is resumed.

It will be appreciated that the harvester device illustrated hereinabove is given by way of an example of the preferred embodiment, it being understood that the scope of protection to which this invention is entitled is not intended to be limited to the specific examples given herein.

What is claimed is:

1. A sod harvesting machine comprising, in combination, a wheeled frame having an elongated frame axis with opposed front and rear ends, at least one cutterhead at the forward end, a sod receiving wind-up saddle at the rear end, and an endless driven conveyor with a belt and at least one drive member extending therebetween, said conveyor belt having a top flight with forward-most, rearward-most, and intermediate segments, said forward-most segment receiving cut sod from the cutterhead to be advanced rearwardly for elevation and to said wind-up saddle for wind-up and discharge, and with said sod harvesting machine having cut-off means for intermittently severing cut sod for processing in defined lengths; said combination being further characterized in that:

(a) said wind-up saddle comprises a laterally spaced apart pair of normally upwardly extending saddle arms pivotally attached to said frame and adapted for pivotal movement to form an adjustably expandable sod receiving wind-up saddle of generally "U" shaped configuration along said conveyor belt, said wind-up saddle having an axis generally transverse to said elongated frame axis;

(b) said endless conveyor having belt supporting means including drive and idler cylinders, at least one drive cylinder and selected idler cylinders being disposed along said rearward-most segment and journaled for rotation within said upwardly extending saddle arms, activating means for pivotally moving said saddle arms for controllably delineating conveyor belt travel within said saddle for carrying lengths of incoming cut sod into said saddle to be helically wound into rolls directly from said conveyor belt;

(c) said actuating means being coupled to said upwardly extending saddle arms for coordinated selective and adjustable pivotal movement of said arms relative to said frame means toward and away from said normal upwardly extending position for controlled movement between closed saddle, expanded saddle, and discharge saddle dispositions whereby expansion of the width of said saddle is provided while receiving, winding and discharging helically wound lengths of cut sod therefrom, with the expansion of said saddle accommodating the increasing radius of rolls of helically cut sod being wound from said defined lengths of cut sod.

2. The combination as set forth in claim 1 further comprising net applicator means mounted adjacent said rearward-most segment, said net applicator means including means for receiving, retaining, and applying a film of netting to a surface of said cut sod prior to undergoing rotational winding within said saddle, and wherein netting cut-off means are provided for cutting said netting to a length substantially equal to each defined length of incoming cut sod.

3. The combination as set forth in claim 2 wherein said netting is a layer of film.

4. The combination as set forth in claim 3 wherein said film is polyethylene.

5. The combination as set forth in claim 1 wherein one drive member journaled within and extends between said upwardly extending saddle arms.

6. The combination as set forth in claim 5 wherein said endless conveyor includes at least first and second drive cylinders, with said second drive cylinder being journaled within said frame forwardly of said upwardly extending saddle arms.

* * * * *